US012545858B2

(12) United States Patent
Eisert et al.

(10) Patent No.: US 12,545,858 B2
(45) Date of Patent: Feb. 10, 2026

(54) LIQUID CLEANING AGENT CONCENTRATE, READY-TO-USE SOLUTION, USES THEREOF AND CLEANING METHOD

(71) Applicant: CHEMISCHE FABRIK DR. WEIGERT GMBH & CO. KG, Hamburg (DE)

(72) Inventors: Dennis Eisert, Börnsen (DE); Bastian Wulff, Hamburg (DE); Matthias Springer, Hamburg (DE)

(73) Assignee: CHEMISCHE FABRIK DR. WEIGERT GMBH & CO. KG, Hamburg (DE)

( * ) Notice: Subject to any disclaimer, the term of this patent is extended or adjusted under 35 U.S.C. 154(b) by 245 days.

(21) Appl. No.: 18/250,134

(22) PCT Filed: Oct. 22, 2021

(86) PCT No.: PCT/EP2021/079351
§ 371 (c)(1),
(2) Date: Apr. 21, 2023

(87) PCT Pub. No.: WO2022/084511
PCT Pub. Date: Apr. 28, 2022

(65) Prior Publication Data

US 2023/0399587 A1 Dec. 14, 2023

(30) Foreign Application Priority Data

Oct. 23, 2020 (EP) .................................... 20203504

(51) Int. Cl.
*C11D 3/33* (2006.01)
*C11D 3/22* (2006.01)
*C11D 3/36* (2006.01)
*C11D 3/37* (2006.01)

(52) U.S. Cl.
CPC .............. *C11D 3/361* (2013.01); *C11D 3/221* (2013.01); *C11D 3/33* (2013.01); *C11D 3/364* (2013.01); *C11D 3/365* (2013.01); *C11D 3/3719* (2013.01); *C11D 2111/16* (2024.01)

(58) Field of Classification Search
CPC .. C11D 3/361; C11D 3/33; C11D 1/83; C11D 3/386; C11D 3/38618; C11D 3/48; C11D 2111/14; C11D 2111/16
See application file for complete search history.

(56) References Cited

U.S. PATENT DOCUMENTS

| | | | | |
|---|---|---|---|---|
| 6,165,970 | A * | 12/2000 | Williams (nee Mac Beath) ......... | C11D 3/3907 510/318 |
| 2013/0199569 | A1* | 8/2013 | Cabirol ................ | C11D 3/2082 134/18 |
| 2013/0206181 | A1* | 8/2013 | Giles ........................ | C11D 3/33 562/571 |
| 2017/0355933 | A1 | 12/2017 | Lant et al. | |
| 2019/0382691 | A1* | 12/2019 | Weber .................... | C11D 3/386 |
| 2020/0164316 | A1* | 5/2020 | Skou ...................... | B01D 65/06 |
| 2020/0216781 | A1* | 7/2020 | Schaefer .............. | C11D 3/0073 |
| 2020/0283702 | A1 | 9/2020 | Wieland et al. | |

FOREIGN PATENT DOCUMENTS

| | | | |
|---|---|---|---|
| CN | 106635488 | | 5/2017 |
| CN | 110997117 | A | 4/2020 |
| DE | 102014003484 | | 9/2015 |
| EP | 3330353 | A1 | 6/2018 |
| JP | H11349989 | A | 12/1999 |
| JP | 2009114336 | A | 5/2009 |
| JP | 2020164729 | A | 10/2020 |
| WO | WO-9850512 | A1 | 11/1998 |
| WO | WO 02/02727 | | 1/2002 |
| WO | WO 2012/038755 | | 3/2012 |
| WO | WO-2012028203 | A1 | 3/2012 |
| WO | WO 2016/007291 | | 1/2016 |

OTHER PUBLICATIONS

International Search Report and Written Opinion for PCT/EP2021/079351. Mailed Dec. 22, 2021. 10 pages.
European Search Report for application 20203504.4-1105. Mailed Mar. 30, 2021. 8 pages.
English Translation of International Preliminary Report on Patentability for PCT/EP2021/079351. Jan. 25, 2023. 6 pages.

* cited by examiner

*Primary Examiner* — Charles I Boyer
(74) *Attorney, Agent, or Firm* — Casimir Jones, S.C.; Anne M. Reynolds

(57) ABSTRACT

Liquid cleaning agent concentrate comprising: a. at least one phosphonate, b. a first complexing agent selected from aminopolycarboxylic acids, hydroxycarboxylic acids, hydroxypolycarboxylic acids and their salts, and c. at least one enzyme, preferably proteolytic enzyme, a pH of the liquid cleaning agent concentrate being 9 or >9). The invention also relates to a ready-to-use solution; to uses thereof for cleaning and/or disinfecting objects and to cleaning methods.

15 Claims, 8 Drawing Sheets a)

b)

Figure 1:
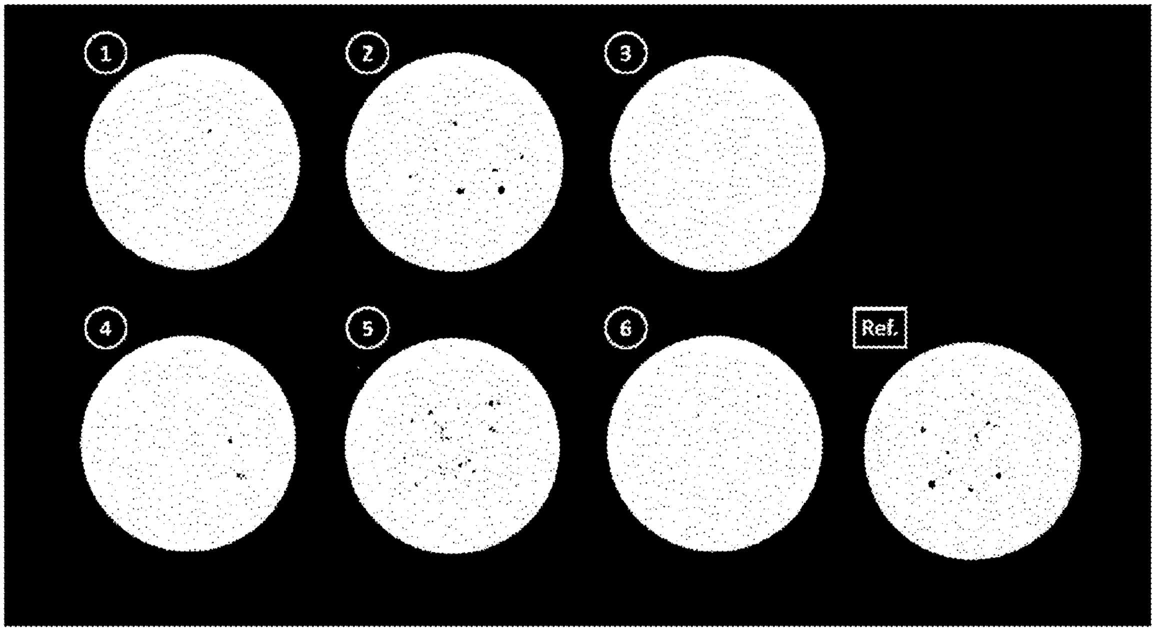
Figure 1:
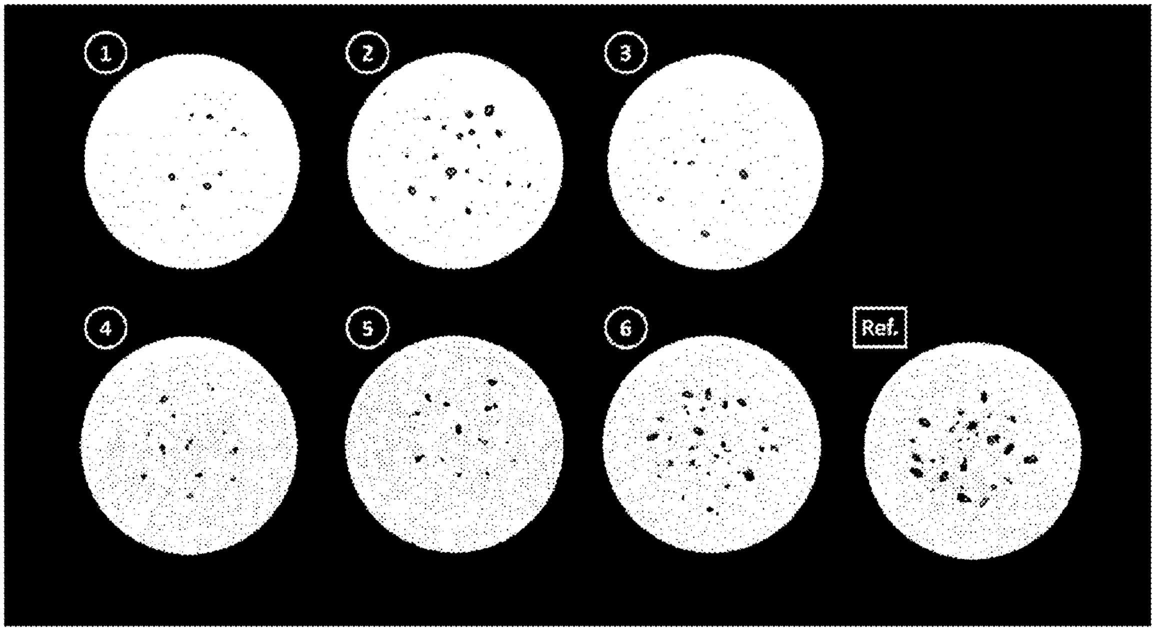

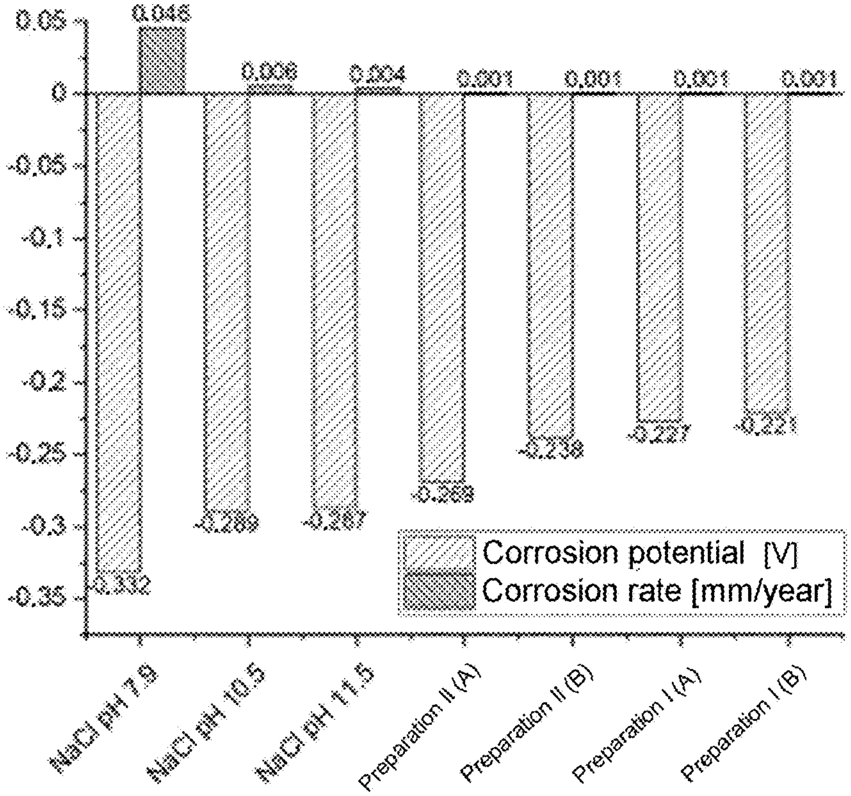
Figure 5
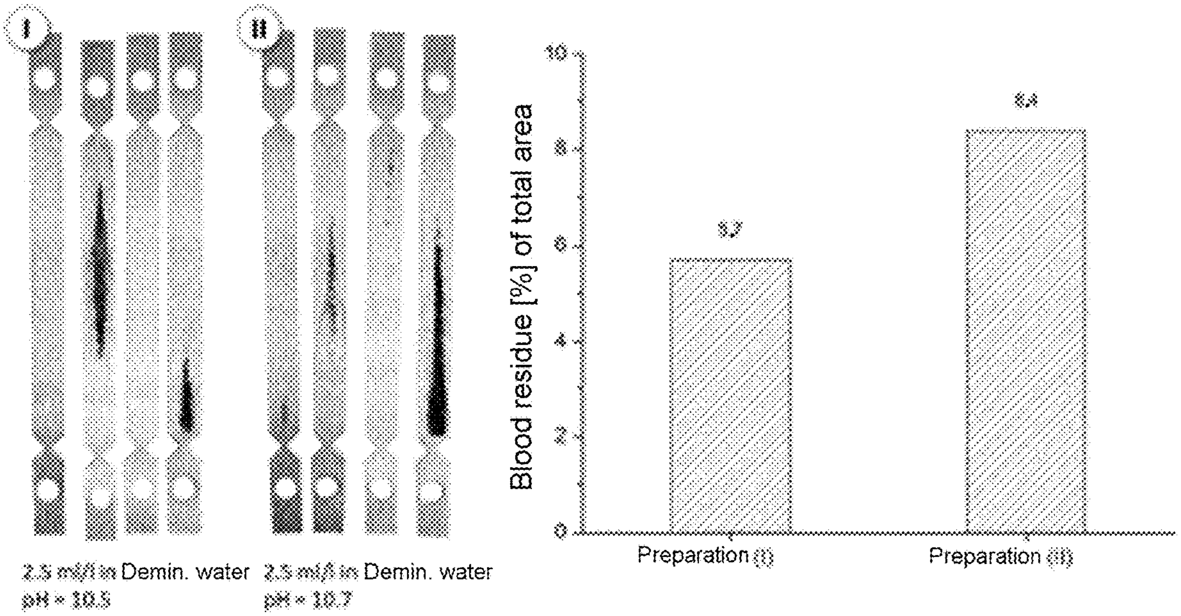

LIQUID CLEANING AGENT CONCENTRATE, READY-TO-USE SOLUTION, USES THEREOF AND CLEANING METHOD

The present invention relates to a liquid cleaning agent concentrate, ready-to-use application solutions, uses thereof for cleaning and/or disinfecting objects and cleaning methods.

Medical and surgical instruments and apparatuses are usually cleaned by machine in hospitals using alkaline cleaning agents and then chemically or thermally disinfected. Strongly alkaline cleaning agents can have an aggressive effect on sensitive surfaces. Mildly alkaline enzymatic cleaning agents are therefore preferred, but they have the disadvantages of unsatisfactory cleaning performance and high application concentrations. In addition, the enzymatic cleaning agents known in the prior art often comprise other aggressive constituents which are not well tolerated on all surfaces and can have a corrosive effect on metal surfaces in particular.

The invention is based on the object of providing a liquid cleaning concentrate and a ready-to-use application solution thereof which enable very good cleaning performance at only a low application concentration and at the same time exhibit high material compatibility on various materials, in particular metal surfaces.

The invention achieves this object by the features of the claims. The claims are directed to a liquid cleaning agent concentrate, comprising:

a. at least one phosphonate, b. a first chelating agent selected from (hydroxyethyl) ethylenediaminetriacetic acid, methylglycinediacetic acid and salts thereof, c. a second chelating agent selected from (hydroxyethyl) ethylenediaminetriacetic acid, ethylenediaminetetraacetic acid, glutamic acid-N,N-diacetic acid, iminodisuccinic acid, methylglycinediacetic acid and salts thereof, where the first and second chelating agents are different from one another, and d. at least one enzyme, preferably proteolytic enzyme, wherein a pH of the liquid cleaning agent concentrate is 9 or >9.

Advantageous embodiments can be found in the dependent claims.

In the context of the invention, the liquid cleaning agent concentrate according to the invention may be diluted with water or a water-containing solvent mixture to give the ready-to-use application solution. However, this does not preclude the possibility that the liquid cleaning concentrate itself may contain water or a water-based solvent mixture.

The liquid cleaning agent concentrate preferably has a pH of 9-12, more preferably 10-12, even more preferably 10-11.

1. Phosphonate

The liquid cleaning agent concentrate comprises at least one phosphonate. In the context of the invention, a phosphonate is a salt of a phosphonic acid. The phosphonate is preferably selected from the salts of phosphonobutane tricarboxylic acid (PBTC), of amino trismethylenephosphonic acid (ATMP), of 1-hydroxyethane-1,1-diphosphonic acid (HEDP), of diethylenetriamine penta(methylene phosphonic acid) (DTPMP) and mixtures thereof. The salts can be alkali metal salts, preferably sodium and potassium salts, more preferably sodium salts. More preferably, the phosphonate is the sodium salt of PBTC, the sodium salt of ATMP or mixtures thereof.

The phosphonate or the phosphonate mixture in the liquid cleaning agent concentrate is preferably present at a proportion by weight of 1 to 13% by weight, more preferably of 2 to 10% by weight, even more preferably 3 to 8% by weight, based on the total mass of the liquid cleaning agent concentrate.

Firstly, in the context of the invention, the phosphonate shows the advantageous effect as corrosion inhibitor. Secondly, in the context of the invention, it was observed that the phosphonate serves to stabilize the cleaning formulation. Without phosphonate, considerable fluctuations in the pH in the liquid cleaning agent concentrate are observed when varying individual ingredients. The phosphonate thus not only serves to inhibit corrosion, but also functions as a pH buffer.

2. Chelating Agent

The liquid cleaning agent concentrate comprises a first chelating agent selected from (hydroxyethyl) ethylenediaminetriacetic acid (HEDTA), methylglycine diacetic acid (MGDA), and salts thereof. The salts can be alkali metal salts, preferably sodium and potassium salts, more preferably sodium salts.

In a preferred embodiment, the first chelating agent is selected from aminopolycarboxylic acids and salts thereof. The first chelating agent is preferably the sodium salt of HEDTA, of EDTA, of GLDA, of IDS or of MGDA, more preferably the sodium salt of MGDA or of HEDTA.

The first chelating agent in the liquid cleaning agent concentrate is preferably present at a proportion by weight of 0.5 to 10% by weight, more preferably 1 to 8% by weight, even more preferably 2 to 6% by weight, based on the total mass of the liquid cleaning agent concentrate.

The liquid cleaning agent concentrate further comprises a second chelating agent selected from HEDTA, EDTA, GLDA, IDS, MGDA, and salts thereof, wherein the first and second chelating agents are different from each other. The second chelating agent is preferably the sodium salt of HEDTA, of EDTA, of GLDA, of IDS or of MGDA, more preferably the sodium salt of MGDA or of HEDTA.

The second chelating agent in the liquid cleaning agent concentrate is preferably present at a proportion by weight of 0.5 to 10% by weight, more preferably 1 to 8% by weight, even more preferably 2 to 6% by weight, based on the total mass of the liquid cleaning agent concentrate.

In preferred embodiments, the liquid cleaning agent concentrate comprises the sodium salt of PBTC, the sodium salt of ATMP or a mixture thereof as the phosphonate, the sodium salt of HEDTA as the first chelating agent, and preferably the sodium salt of MGDA as the second chelating agent.

Surprisingly, the combination of the first and the second chelating agent, in addition to the phosphonate, and the selection thereof, has a considerable influence on the cleaning performance and the corrosion capacity of the liquid cleaning agent. It could be observed that the cleaning performance and the corrosion-inhibiting effect are in an opposite relationship to each other. Good corrosion inhibition results in poorer cleaning performance and vice versa. However, the two properties can be adjusted in the best possible way by the combination of first and second chelating agent, in addition to the phosphonate.

3. Enzyme

The liquid cleaning agent concentrate comprises at least one enzyme. The enzyme is preferably a proteolytic enzyme or enzyme mixture.

The enzyme or the enzyme mixture in the liquid cleaning agent concentrate is preferably present at a proportion by weight of 0.05 to 4% by weight, more preferably of 0.1 to 2% by weight, based on the total mass of the liquid cleaning agent concentrate. The enzyme activity is preferably $30\times10^{-2}$ to $100\times10^{-2}$ KNPU/g, more preferably $70\times10^{-2}$ to $85\times10^{-2}$ KNPU/g.

4. Other Constituents

The liquid cleaning agent concentrate may also include further constituents selected from surfactants, hydrotropes, alkanolamines, alkali metal hydroxides, solvents, corrosion inhibitors, fragrances and dyes.

The surfactants can be cationic surfactants, anionic surfactants, non-ionic surfactants, amphoteric surfactants and mixtures thereof. Cationic surfactants are selected, for example, from alkylamines and polyamines. Examples of anionic surfactants are alkyl carboxylates and amino acid-based surfactants. Non-ionic surfactants are selected, for example, from alkyl alkoxylates, alkylphenol ethoxylates, fatty alcohol alkoxylates, fatty acid amides, fatty acid alkoxylates, fatty acid alkyl esters, fatty amines, alkylpolyamines, fatty amide ethoxylates and amine oxides. Amphoteric surfactants are selected, for example, from betaines, sultaines and glycinates. The surfactants are preferably selected from fatty alcohol alkoxylates, amino acid-based surfactants and mixtures thereof.

The fatty alcohol alkoxylate may be selected from fatty alcohol ethoxylates (FAEO) and fatty alcohol propoxylates (FAPO), butyl-etherified fatty alcohol ethoxylates (FAEOBV), butyl-etherified fatty alcohol propoxylates (FAPOBV), methyl-etherified fatty alcohol ethoxylates (FAEOMV), methyl-etherified fatty alcohol propoxylates (FAPOMV), butyl-etherified fatty alcohol-based EO/PO copolymers (FAEOPOBV), methyl-etherified fatty alcohol-based EO/PO copolymers (FAEOPOMV) and fatty alcohol-based EO/PO copolymers (FAEOPO). The fatty alcohol alkoxylate is preferably a fatty alcohol-based EO/PO copolymer.

The fatty alcohol alkoxylate may comprise 0-10 EO units, preferably 1-4 EO units, more preferably 1-2 EO units. Furthermore, the fatty alcohol alkoxylate may comprise 0-8 PO units, preferably 1-8 PO units, more preferably 4-8 PO units. Furthermore, the fatty alcohol alkoxylate may have at least one C6-C16 fatty alcohol radical, preferably C12-C15 fatty alcohol radical. The fatty alcohol alkoxylate can be selected from the group consisting of C12-C15 fatty alcohol radical having 2EO/6PO units, C12-C15 fatty alcohol radical having 8EO/4PO units, methyl- or butyl-etherified C12-C14 fatty alcohol radical having 10EO units, C10-C12 fatty alcohol radical having 6EO/8PO units, C12-C14 fatty alcohol radical having 2EO/4PO units, C12-C14 fatty alcohol radical having 4EO/5PO units, methyl-etherified C13-C15 fatty alcohol radical having 5EO/3PO units and C13-C15 fatty alcohol radical having 5EO/3PO units. The fatty alcohol alkoxylate is preferably selected from C12-C15 fatty alcohol radical having 2EO/6PO units, C12-C14 fatty alcohol radical having 2EO/4PO units and C12-C14 fatty alcohol radical having 4EO/5PO units.

The fatty alcohol alkoxylate in the liquid cleaning agent concentrate can be present at a proportion by weight of 0.1 to 9% by weight, preferably of 0.4 to 2% by weight, based on the total mass of the liquid cleaning agent concentrate.

The addition of the fatty alcohol alkoxylate can dampen the effect of foaming surfactants. By selecting the fatty alcohol alkoxylate, a desired foaming behavior of the liquid cleaning agent concentrate can be adjusted. Strong foaming is disadvantageous, since low-foaming constituents are required for use in machine cleaning processes, for example by means of instrument rinsing machines or washer-disinfector appliances (WDs). Pronounced foam formation during machine cleaning leads to a drop in the metering pump pressure and ultimately to the cleaning process being aborted.

The amino acid-based surfactant may be selected from compounds having a saturated or monounsaturated C10-C18 carbon radical, preferably a saturated C12-C16 carbon radical.

The amino acid-based surfactant can also be selected from sarcosines, taurines, glutamic acids and salts thereof. The salts can be alkali metal salts, preferably sodium and potassium salts, more preferably sodium salts. Preferred embodiments of the amino acid-based surfactant are selected from lauroyl sarcosine, oleoyl sarcosine, myristoyl sarcosine, stearoyl sarcosine and lauroyl glutamic acid and sodium salts thereof. Particular preference is given to lauroyl sarcosine and lauroyl glutamic acid and sodium salts thereof.

The amino acid-based surfactant in the liquid cleaning agent concentrate may be present at a proportion by weight of 0.05 to 5% by weight, preferably of 0.1 to 2% by weight, based on the total mass of the liquid cleaning agent concentrate.

The liquid cleaning concentrate may comprise hydrotropes. In the context of the invention, "hydrotropes" are compounds that act as solubilizers. According to the invention, these are in particular amphiphilic compounds having a relatively small polar moiety and a larger non-polar moiety, which are soluble in both non-polar and polar solvents. The compounds defined as hydrotropes according to the invention exhibit less hydrophobic properties and higher solubility in water. The polar moiety ensures higher solubility in water while the non-polar moiety acts as a functional group. Hydrotropes according to the invention make it possible in particular to formulate a clear and stable liquid cleaning agent concentrate and a clear ready-to-use application solution. According to the invention, the compounds defined as surfactants are not hydrotropes.

In the context of the invention, hydrotropes may be selected from alkyl sulfates, preferably C6-C10-alkyl sulfates and sodium salts thereof, more preferably sodium octyl sulfate and sodium ethylhexyl sulfate; alkyl sulfonates, preferably C6-C10-alkyl sulfonates; aromatic sulfonates, preferably xylene sulfonate, p-toluenesulfonate and sodium salts thereof; propionates, preferably isooctylimino dipropionate, n-octylimino dipropionate, caprylic and capric amphopropionate; C4-C10 ether carboxylic acids having 4-10 EO units, preferably alkyl(8) polyether carboxylic acid having 8 EO units and alkyl(4-8) polyether carboxylic acid having 5 EO units; alkyl glycosides, alkyl diglycosides, alkyl polyglycosides and mixtures thereof, where the alkyl radical is preferably a branched or unbranched C4-C16-alkyl radical and the glycoside radical is preferably selected from a hexose unit and pentose unit, more preferably is selected from a glucopyranose unit and a xylopyranose unit. Preferably, the hydrotrope is sodium octyl sulfate, sodium ethylhexyl sulfate or a mixture thereof.

In the context of the invention, the hydrotrope functions to clarify the formulation within a certain temperature range and optionally as a solubilizer for the fatty alcohol alkoxylate.

The hydrotrope in the liquid cleaning agent concentrate may be present at a proportion by weight of 0.05 to 13% by weight, preferably of 0.1 to 7% by weight, more preferably 0.15 to 3.5% by weight, based on the total mass of the liquid cleaning agent concentrate.

The alkanolamine is preferably selected from monoethanolamine, triethanolamine, monoisopropanolamine and mixtures thereof. In the context of the invention, the alkanolamine or mixture thereof serves in particular to adjust the alkalinity of the liquid cleaning agent. Monoethanolamine has the advantage of being a good protein purifier. The alkanolamine or mixture thereof in the liquid cleaning agent concentrate is preferably present at a proportion by weight of 1 to 26% by weight, more preferably of 4 to 18% by weight, based on the total mass of the liquid cleaning agent concentrate.

The alkali metal hydroxide is preferably sodium hydroxide and/or potassium hydroxide, more preferably potassium hydroxide. In the context of the invention, the alkali metal hydroxide serves in particular to adjust the alkalinity of the liquid cleaning agent. Potassium hydroxide in the liquid cleaning agent concentrate is preferably present at a proportion by weight of 1 to 8% by weight, more preferably 2 to 5% by weight, based on the total mass of the liquid cleaning concentrate.

The solvent can be water or a water-containing solvent mixture. Preference is given to solvent mixtures which, in addition to water, comprise organic solvents selected from ethanol, 2-propanol, glycols, glycerol and mixtures thereof. A preferred glycol is 1,2-propylene glycol. The organic solvent in the liquid cleaning agent concentrate is preferably present at a proportion by weight of 0.5 to 10% by weight, more preferably of 3 to 7% by weight, based on the total mass of the liquid cleaning agent concentrate.

Water is preferably present in the liquid cleaning agent concentrate at a proportion by weight of 30 to 90% by weight, more preferably of 35 to 70% by weight, even more preferably of 35 to 60% by weight, still more preferably 35 to 50% by weight, even further preferably 35 to 45% by weight, based on the total mass of the liquid cleaning agent concentrate.

The invention is based on the surprising finding that the combination of at least one phosphonate and a first chelating agent in the liquid cleaning agent concentrate achieves very good cleaning performance at only a low use concentration and, at the same time, has high material compatibility when used on various materials, in particular on metal surfaces.

It was observed that the active ingredients present in the liquid cleaning agent concentrate can be used at a significantly lower dosage than that of other cleaning agents known in the prior art. This is due in particular to a synergistic effect with respect to the cleaning performance achieved. The cleaning performance of the concentrate, with regard to blood, comprising the combination of phosphonate and the first chelating agent is better than that of the respective individual components. This relates in particular to chelating agents selected from the substance class of aminopolycarboxylic acids and salts thereof.

In the prior art, enzymatic, mildly alkaline liquid cleaning agents, which preferably comprise surfactants, are usually metered in at a water temperature of about 40° C. during machine cleaning. This is necessary because the cleaning agent tends to foam too much at lower temperatures. The disadvantage of this, however, is that the running time of the cleaning programs is longer, since the heating time from the inlet temperature (usually ca. 18-22° C.) up to 40° C. causes a delay before the cleaner can take effect. However, the liquid cleaning agent concentrate according to the invention makes it possible to carry out cold dispensing directly after the water inlet, at a temperature of preferably 38° C. or less, more preferably of 18 to 35° C., even more preferably of 20 to 30° C., still more preferably of 22 to 27° C., even further preferably at about 25° C., without the program being aborted due to excessive foam development. Such cold water dispensing is currently not possible with the liquid cleaning agents that are known from the prior art and are commercially available. The cold dispensing of the liquid cleaning agent concentrate has independent inventive content.

Another important requirement for the liquid cleaning agent concentrate is the highest possible material compatibility when used on different materials. The corrosion protection of stainless steel and (color) anodized aluminum parts is important, especially with regard to medical and/or surgical instruments and/or apparatuses. Surprisingly, the concentrate exhibits high material compatibility when applied to various materials. In particular, the presence of the combination of phosphonate and first chelating agent results in significantly improved corrosion inhibition characteristics on stainless steel and (color) anodized aluminum parts. In addition, surprisingly, improved shine and an improved feel, especially of stainless steel parts, are observed with more frequent use of the liquid cleaning agent concentrate according to the invention.

In the context of the invention, it was observed that the phosphonate not only functions as a chelating or dispersing agent, but also has an advantageous effect as a corrosion inhibitor. Furthermore, without phosphonate, considerable fluctuations in pH in the liquid cleaning agent concentrate are observed when varying individual formulation ingredients. Therefore, this not only serves as a corrosion inhibitor, but also additionally acts as a buffer.

In addition, it was found that the combination of two chelating agents, in addition to the phosphonate, and the selection thereof, has a significant influence on the cleaning performance and the ability to inhibit corrosion. Chelating agents having higher complex formation constants for $Ca^{2+}$ and $Mg^{2+}$ ions show better cleaning performance in combination with respect to blood. It could be observed that the cleaning performance and the corrosion capacity are in an opposite relationship to each other. Good corrosion inhibition results in poorer cleaning performance and vice versa. However, these properties can be optimized in the best possible way by the combination of a first and a second chelating agent, in addition to the phosphonate.

The invention further relates to a ready-to-use application solution comprising 0.05 to 99.9% of the liquid cleaning agent concentrate according to the invention, wherein a pH of the ready-to-use application solution is 9 or >9, preferably 9-12, more preferably 10-12, even more preferably 10-11.

The ready-to-use application solution preferably comprises 0.05 to 10%, more preferably 0.1 to 1%, of the liquid cleaning agent concentrate according to the invention.

The constituents, properties and advantageous effects of the ready-to-use application solution listed above correspond to those previously defined for the liquid cleaning agent concentrate. However, the constituents in the ready-to-use application solution are present in the following proportions by weight:

The phosphonate or the phosphonate mixture in the ready-to-use application solution is preferably present at a proportion by weight of 0.0005 to 1.3% by weight, more preferably 0.002 to 0.1% by weight, even more preferably 0.003 to 0.08% by weight, based on the total mass of the ready-to-use application solution.

The first chelating agent in the ready-to-use application solution is preferably present at a proportion by weight of 0.00025 to 1.0% by weight, more preferably 0.001 to 0.08% by weight, even more preferably 0.002 to 0.06% by weight, based on the total mass of the ready-to-use application solution.

The second chelating agent in the ready-to-use application solution is preferably present at a proportion by weight of 0.00025 to 1.0% by weight, more preferably 0.001 to 0.08% by weight, even more preferably 0.002 to 0.06% by weight, based on the total mass of the ready-to-use application solution.

The enzyme or the enzyme mixture in the ready-to-use application solution is preferably present at a proportion by weight of 0.000025 to 0.04% by weight, more preferably of 0.0001 to 0.02% by weight, based on the total mass of the ready-to-use application solution.

The fatty alcohol alkoxylate in the ready-to-use application solution can be present at a proportion by weight of 0.00005 to 0.9% by weight, more preferably 0.0004 to 0.02% by weight, based on the total mass of the ready-to-use application solution.

The amino acid-based surfactant in the ready-to-use application solution can be present at a proportion by weight of 0.000025 to 0.5% by weight, preferably 0.0001 to 0.02% by weight, based on the total mass of the ready-to-use application solution.

The hydrotrope in the ready-to-use application solution may be present at a proportion by weight of 0.000025 to 1.3% by weight, preferably of 0.0001 to 0.07% by weight, even more preferably 0.00015 to 0.035% by weight, based on the total mass of the ready-to-use application solution.

The alkanolamine or mixture thereof in the ready-to-use application solution can be present at a proportion by weight of 0.0005 to 2.6% by weight, preferably of 0.004 to 0.18% by weight, based on the total mass of the ready-to-use application solution.

The alkali metal hydroxide in the ready-to-use application solution can be present at a proportion by weight of 0.0005 to 0.8% by weight, preferably of 0.002 to 0.05% by weight, based on the total mass of the ready-to-use application solution.

The organic solvent in the ready-to-use application solution can be present at a proportion by weight of 0.00025 to 1.0% by weight, preferably 0.003 to 0.07% by weight, based on the total mass of the ready-to-use application solution.

Water in the ready-to-use application solution may be present at a proportion by weight of 90.0 to 99.985% by weight, preferably 95.0 to 99.98% by weight, more preferably 99.6 to 99.96% by weight, based on the total mass of the ready-to-use application solution.

The invention also relates to the use of the liquid cleaning agent concentrate according to the invention or the ready-to-use application solution according to the invention for cleaning and/or disinfecting objects, preferably for machine cleaning and/or disinfecting objects. In an advantageous embodiment, the liquid cleaning agent concentrate or the ready-to-use application solution are preferably dispensed cold, more preferably at a temperature of 38° C. or less, even more preferably of 18 to 35° C., still more preferably of 20 to 30° C., even further preferably of 22 to 27° C., even more preferably at about 25° C.

In the context of the present invention, mechanical cleaning is carried out without human intervention during an automatic program run, preferably in an instrument rinsing machine or in WDs. The wording "cleaning and/or disinfection" expresses the fact that the liquid cleaning agent concentrate and the ready-to-use application solution can be used both in the combination of cleaning and disinfection in a single method step and in program sequences in which a cleaning step is followed by a separate disinfection step.

The objects are preferably medical and/or surgical instruments and/or apparatuses.

The invention further relates to the method for cleaning medical and/or surgical instruments and/or apparatuses, characterized by the following steps:

a) preparing a ready-to-use application solution as described herein,
b) cleaning of the medical and/or surgical instruments and/or apparatuses with the ready-to-use application solution.

In an advantageous embodiment, the ready-to-use application solution is preferably prepared cold, more preferably at a temperature of 38° C. or less, even more preferably of 18 to 35° C., even more preferably of 20 to 30° C., even more preferably of 22 to 27° C., still more preferably at about 25° C. The ready-to-use application solution can be prepared by dispensing the liquid cleaning concentrate according to the invention. Optionally, the ready-to-use application solution can also be prepared manually starting from the liquid cleaning agent concentrate according to the invention.

The invention will now be described by way of example on the basis of certain advantageous embodiments with reference to the accompanying drawings. Shown are:

FIG. 1: Corrosion tests with GG25 gray cast iron chips in accordance with DIN 51360 Part 2 at different concentrations of the application solutions (i.e. 1*a*) 10% and 1*b*) 5%)

Figure 2:
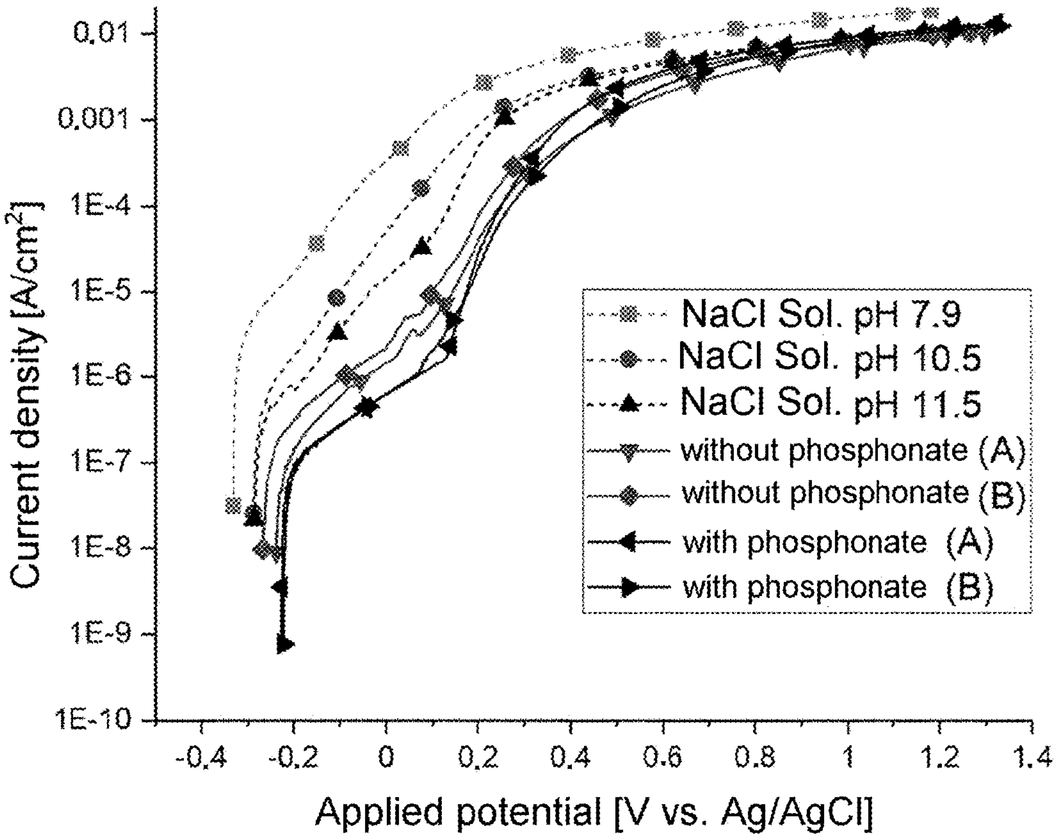

FIG. 2: Current density-potential curves of the anodic partial reactions on test specimens of stainless steel grade 1.4034, wherein the measurements with the preparation (I) according to the invention, the preparation (II) without phosphonate and salt solutions of different pH values are shown as comparisons FIG. 3: Current density-potential curves of the anodic partial reactions on test specimens of stainless steel grade 1.4031, wherein the measurements with the preparation (I) according to the invention, the preparation (II) without phosphonate and salt solutions of different pH values are shown as comparisons FIG. 4: Position of corrosion potentials, i.e. current density minima, (top) and graphical results of the Tafel analysis with test specimens of stainless steel grade 1.4034 (bottom).

FIG. 5: Results of the immersion cleaning tests with the preparation (I) according to the invention and the preparation (II) without phosphonate as comparison, with heparinized sheep's blood as soiling.

Figure 6:
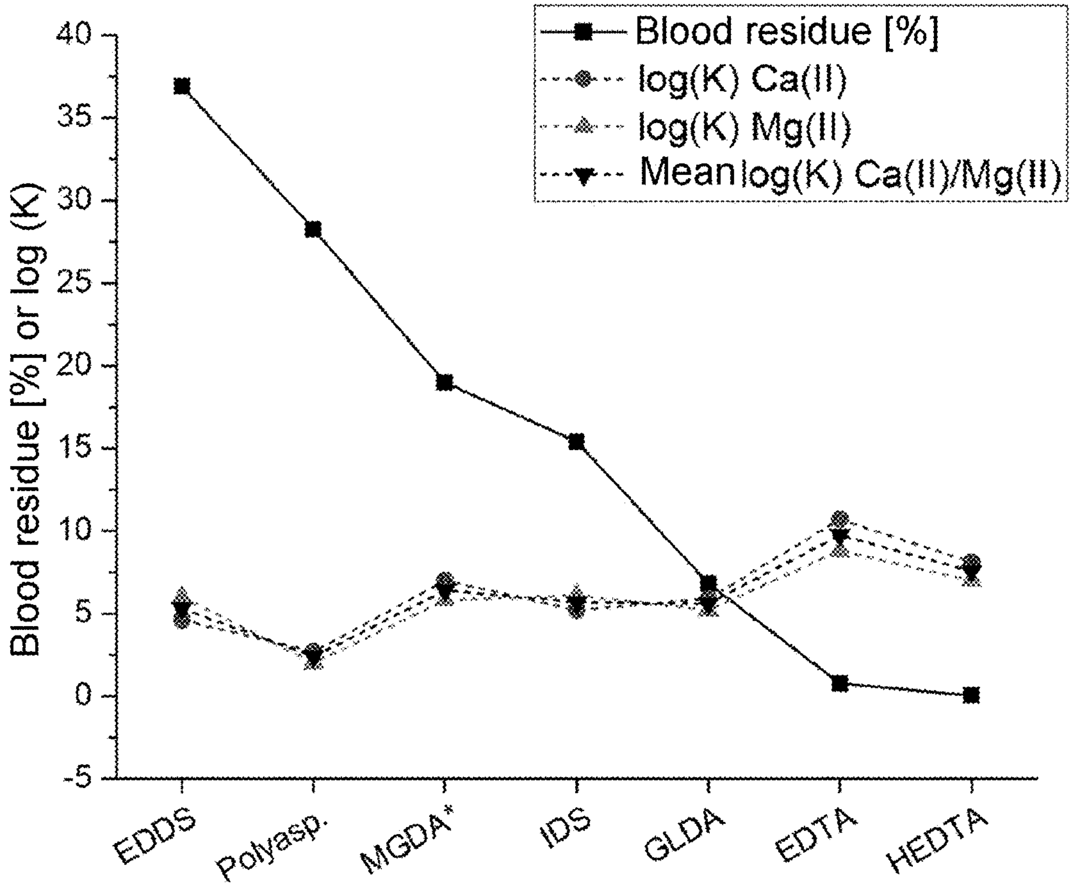

FIG. 6: Cleaning performance of ready-to-use application solutions comprising phosphonate and MGDA with respect to sheep's blood when a second chelating agent is varied, plotted in comparison with log(K) literature values for $Ca^{2+}$ and $Mg^{2+}$.

Figure 7:
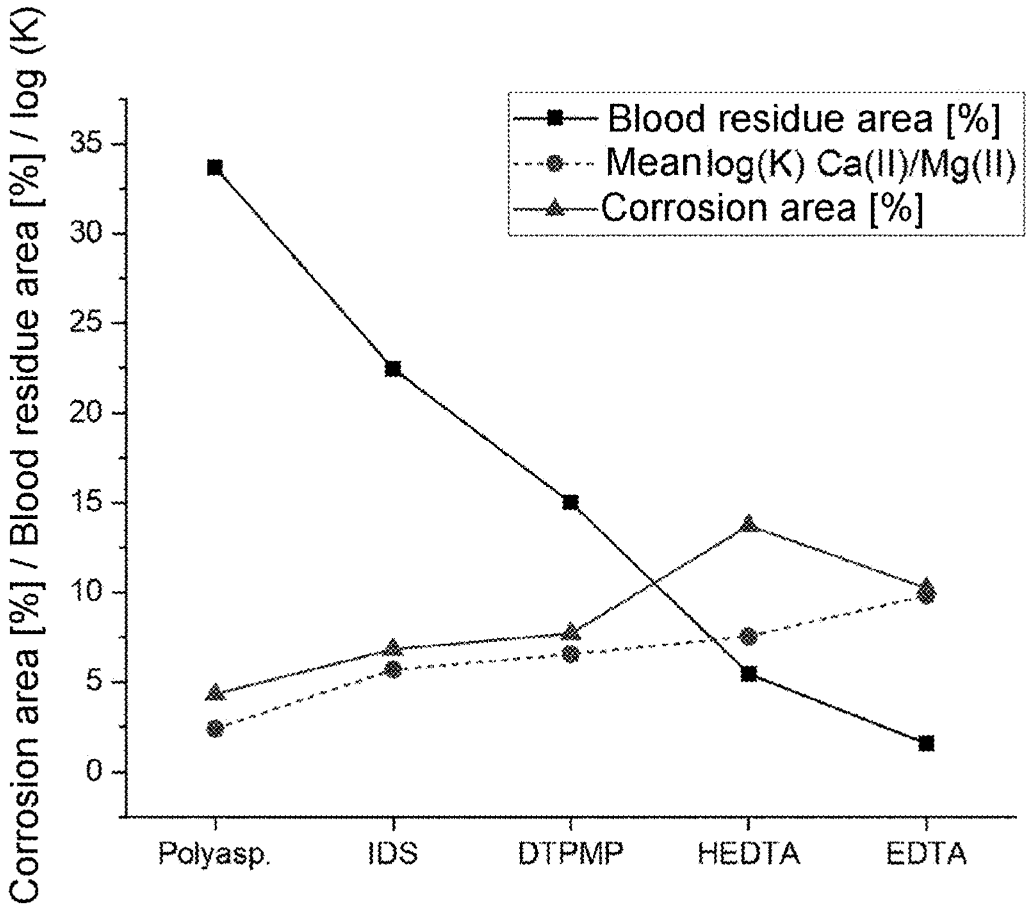

FIG. 7: Cleaning performance and corrosion behavior of ready-to-use application solutions comprising phosphonate and MGDA with respect to sheep's blood when a second chelating agent is varied, plotted in comparison with log(K) literature values for $Ca^{2+}$ and $Mg^{2+}$.

Figure 8:
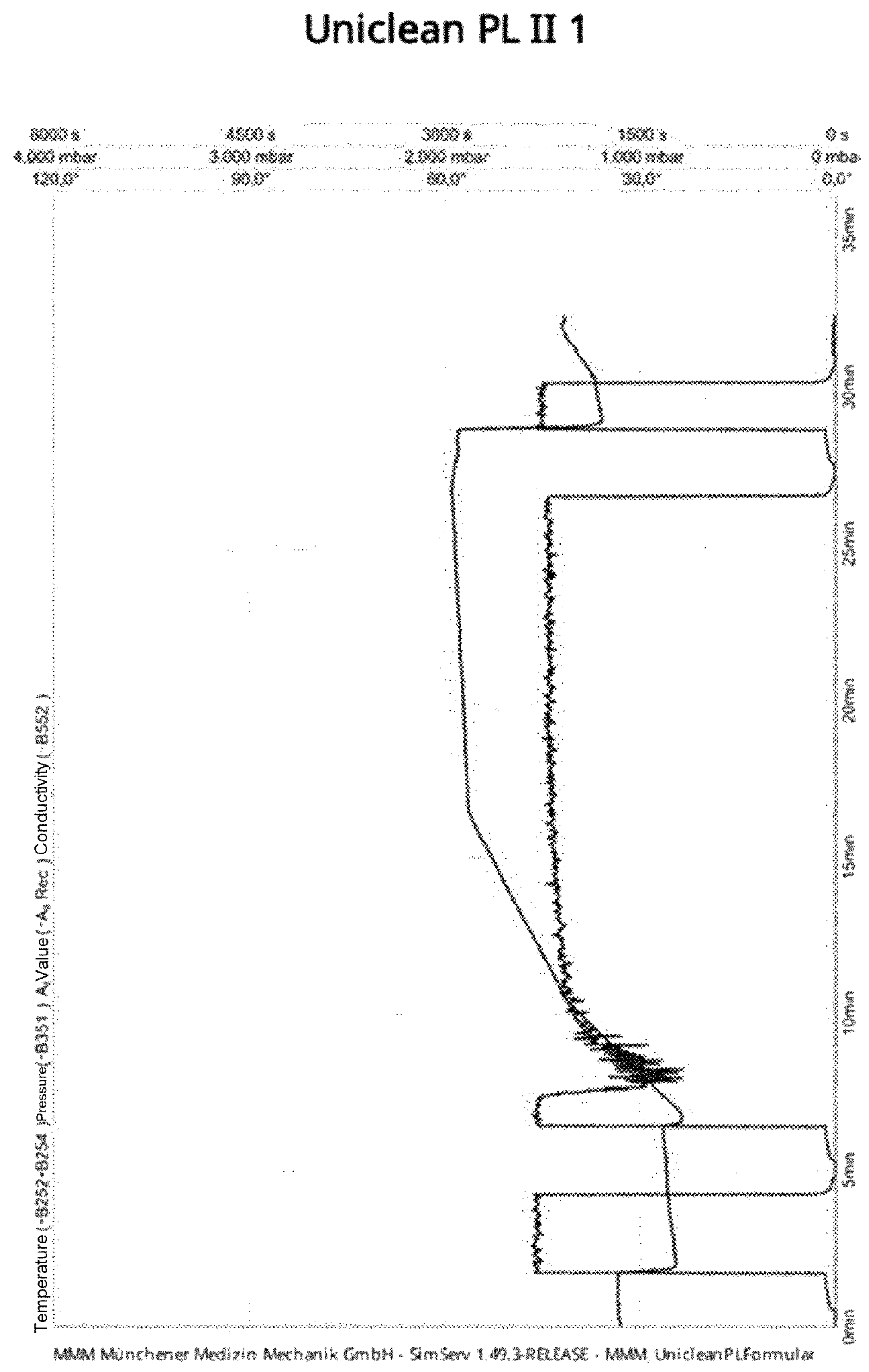

FIG. 8: Pressure and temperature curves for cold water dispensing of a liquid cleaning agent concentrate according to the invention at a concentration of 3 ml/l at 25° C.

Figure 9:
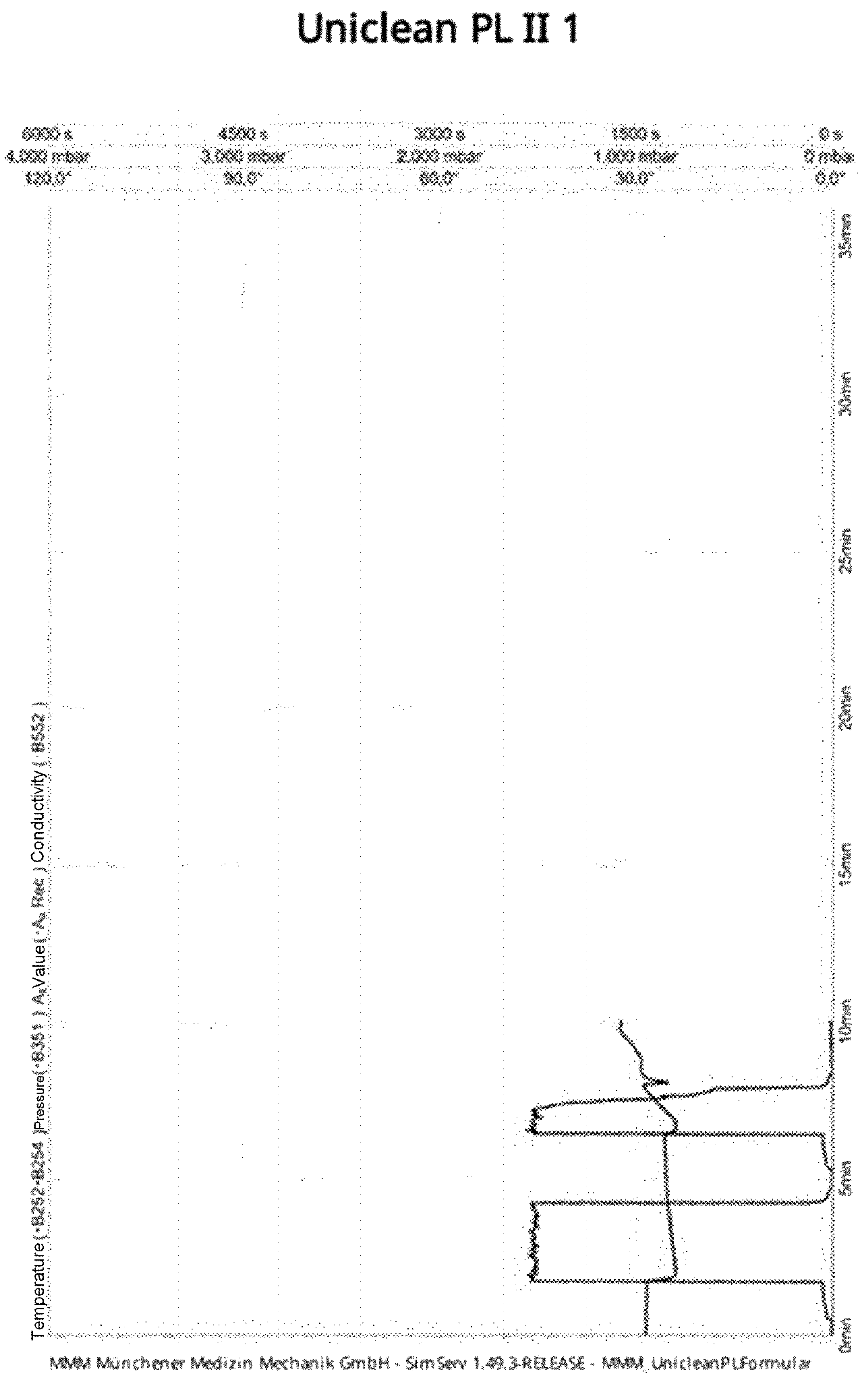

FIG. 9: Pressure and temperature curves for cold water dispensing of the cleaning agents known from the prior art and standard on the market at the respective standard recommended concentration at 25° C.

1. Phosphonate

1. Corrosion Tests with GG25 Gray Cast Iron Chips in Accordance with DIN 51360 Part 2

Four different phosphonates (i.e. the sodium salts of ATMP, HEDP, PBTC, DTPMP) and two other chelating agents (i.e. sodium glucoheptonate, HEDTA) were investigated for their corrosion inhibition effect in equimolar ratios in an otherwise constant liquid cleaning formulation, the pH being adjusted if appropriate. For the assessment, corrosion tests were carried out with GG25 gray cast iron chips in accordance with DIN 51360 Part 2 at different concentrations of the application solutions (i.e. 10% and 5%).

a. Equipment and Materials

Petri dishes Ø 100 mm (glass or plastic)

filter paper Ø 70 mm 589 from Whatman, ash-free, medium-fast filtration gray cast iron GG 25 chips according to DIN 51360 T2 (Riegger Industriehandel, Article 03-39)

demineralized water b. Procedure

Using a spatula, 2.0 g±0.1 g of the chips were weighed onto the filter paper placed in the Petri dish. The chips were distributed as centrally as possible over an area of Ø 40-50 mm. The chips and the filter paper were wetted evenly with 2 ml of the 10% or 5% ready-to-use application solution and the Petri dish was sealed with the lid. The samples prepared in this way were stored for 2 hours±10 minutes at room temperature (20-25° C.) without direct sunlight or drafts. The chips were removed and discarded. The filter paper was rinsed under running demineralized water and swivelled in acetone for 5-10 seconds. The filter paper was dried at room temperature (20-25° C.). The degree of corrosion was determined immediately after drying. Each test was carried out in duplicate.

c. Evaluation

For the evaluation, instead of a visual assessment, the surface area of the corrosion that occurred was related to the total surface area of the filter paper used. The integrals of the surface areas were determined using ImageJ software.

d. Result

FIG. 1 shows the results of the corrosion tests with GG25 gray cast iron chips in accordance with DIN 51360 Part 2 at different concentrations of the application solutions (sample 1: Na-ATMP, sample 2: Na-HEDP, sample 3: Na-PBTC, sample 4: Na-glucoheptonate, sample 5: Na-DTPMP, sample 6: Na-HEDTA; sample ref: comparison without additive), where FIG. 1*a*) shows the tests with 10% ready-to-use application solutions and FIG. 1*b*) shows the tests with 5% ready-to-use application solutions. In both cases, the best results were obtained with the ready-to-use application solutions containing Na-ATMP (Sample 1) and Na-PBTC (Sample 3).

2. Investigations of pH

It was shown that the phosphonate acts as corrosion inhibitor. A further effect of the phosphonate can be observed with a systematic variation of other components, for example the chelating agent, with an otherwise constant composition of the cleaning agent concentrate.

TABLE 1 pH when varying chelating agents in the presence or absence of phosphonate (PBTC)

| Chelating agent | pH without phosphonate | pH with phosphonate |
|---|---|---|
| HEDTA | 12.6 | 10.9 |
| EDDS | 11.0 | 10.6[1] |
| IDS | 11.7 | 10.9 |
| GLDA | 12.4 | 10.9 |
| Polyaspartate | 11.6 | 10.8 |
| EDTA | 12.6 | 10.9 |
| MGDA | 12.3 | 10.9 |
| — | | 10.8 |

[1]raw material used only ¾ deprotonated

The pH is shown to be stable when phosphonate is present. If this is missing, considerable fluctuations in the pH are observed when the ingredients are varied, i.e. when different chelating agents are added (see Table 1). The phosphonate therefore not only serves as corrosion inhibitor in the liquid cleaning concentrate and the ready-to-use application solution, but also acts as a buffer.

2. Combination of Phosphonate and Chelating Agent

Electrochemical corrosion measurements and immersion cleaning tests with heparinized sheep's blood were carried out.

To this end, two preparations were prepared. Preparation (I) is a liquid cleaning agent concentrate according to the invention, which was prepared from the following constituents:

3.5% by weight endoprotease

10% by weight 50% PBTC 8.5% by weight 45% KOH 6.0% by weight 40% MGDA, 3Na 6.0% by weight 40% HEDTA 0.5% by weight fatty alcohol alkoxylate C12-C15 having 2EO/4PO 3.2% by weight 42% Na-octyl sulfate 16% by weight 99% triethanolamine to 100% by weight water Preparation (II) is a comparison without phosphonate having an otherwise identical formulation, where the pH is adjusted to be identical to preparation (I). Based on the tests carried out, the synergistic effect of the phosphonate in combination with aminopolycarboxylates as chelating agents can be clearly demonstrated.

1. Electrochemical Corrosion Measurements a. Measurement Method

In each case, the open circuit potential (OCP) of the system was first determined. This took place over a period of 600 s in order to ensure sufficient equilibrium. The current density-potential curve was then recorded over a potential range of −0.1 to +1.5 V in relation to the measured OCP. For this purpose, a step size of 0.001 V at a scanning speed of 0.01 V/s was set.

b. Procedure

To carry out the electrochemical corrosion experiments, a measurement set-up was used consisting of an Autolab PGSTAT204 potentiostat and a corrosion measuring cell for flat samples (Metrohm AG) having a three-electrode arrangement and a silver/silver chloride reference electrode. Ground stainless steel sheets of grades 1.4034 and 1.4301 were used as test specimens.

Figure 3:
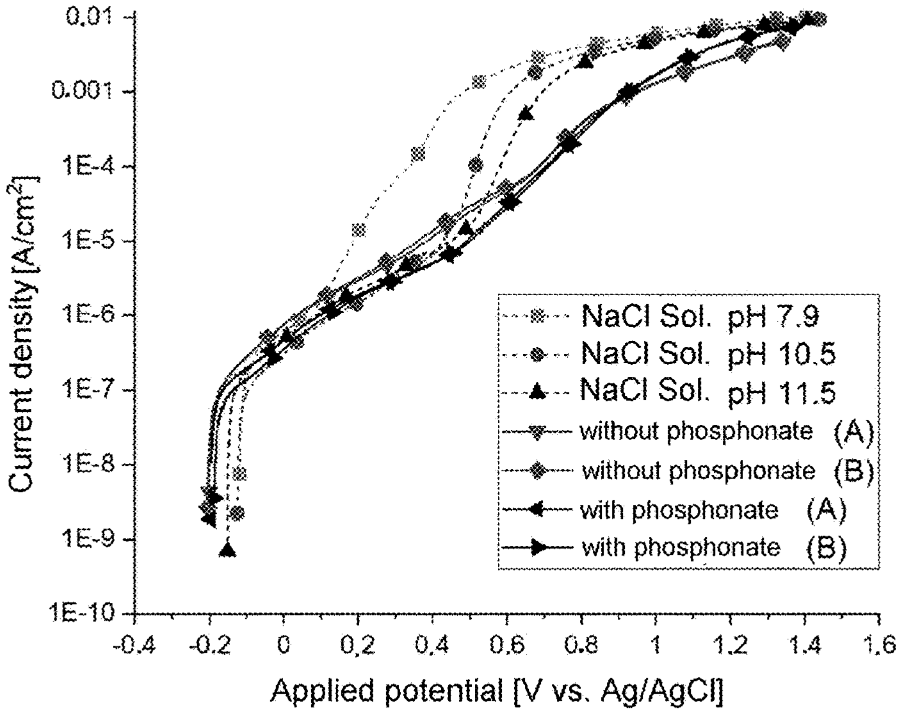
Figure 4:
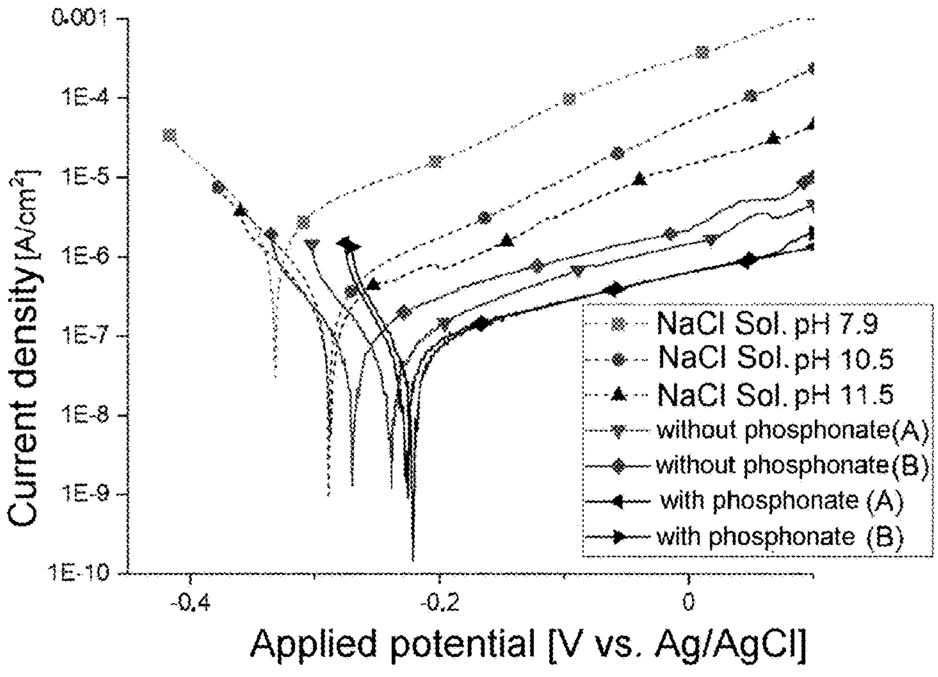

Electrochemical corrosion tests were carried out on test specimens of the two stainless steel grades 1.4034 (chromium steel; less corrosion-resistant; cf. FIG. 2) and 1.4301 (chromium-nickel steel; more corrosion-resistant; cf. FIG. 3). For this purpose, a 10% application solution of preparations (I) and (II) was prepared in a 0.9% solution of sodium chloride (corresponding to physical saline solution) in order to obtain the required corrosive conditions and current density-potential curves were recorded. The pH was 10.5 for preparation (I) with phosphonate and 11.5 for preparation (II) without phosphonate. Despite the lower pH of the application solution from preparation (I), the measurements showed lower corrosion currents than in the case of the phosphonate-free variant at higher pH (see FIG. 2). In principle, it would have been expected that the corrosion resistance of steels also increases with increasing pH, so that improved resistance at a comparatively lower pH also indicates a clear inhibition effect.

In order to be able to rule out that the pH is responsible for the observed behavior, further tests were carried out with salt solutions in which the pH was adjusted to 10.5 or 11.5 with potassium hydroxide solution. This corresponds to the measured pH of the two application solutions, but without constituents of the cleaning solutions being able to influence the corrosion behavior. A test with sodium chloride solution without pH adjustment was also carried out as reference (pH=7.9). The associated current density-potential curves (see FIG. 2) clearly show that the corrosion current decreases with increasing pH. Thus, as expected, a lower current can be observed at pH=11.5 compared to pH=10.5 and pH=7.9.

Especially in the test series with the less corrosion-resistant steel 1.4034 (cf. FIG. 2), the effects of the pH alone, and the additional effect of the two formulations, can be perfectly differentiated. Thus, the corrosion potentials and corrosion rates of the individual measurements determined by Tafel analysis also clearly depict here the effects described. These can be found in Table 2 below and in FIG. 4.

In the case of the NaCl solutions, the increasing pH resulted in a decrease in the corrosion rate and in a shift in the corrosion potential in the direction of more positive potentials. The addition of the application solutions enhanced both effects in the same pH range, with the variant according to the invention with phosphonate showing the corrosion potentials shifted the most towards more positive values, although the pH here is lower than in the comparative variant without phosphonate, as described above.

TABLE 2

Corrosion potentials and corrosion rates from the Tafel analysis of the corrosion experiments carried out, where the experiments of preparations (I) and (II) were each carried out as duplicate determinations (A) and (B).

| Steel 1.4034 | Corrosion potential [V] | Corrosion rate [mm/year] |
|---|---|---|
| 0.9% NaCl pH = 7.9 | −0.332 | 0.046 |
| 0.9% NaCl pH = 10.5 | −0.289 | 0.006 |
| 0.9% NaCl pH = 11.5 | −0.287 | 0.004 |
| Preparation II (A) | −0.269 | 0.001 |
| Preparation II (B) | −0.238 | 0.001 |
| Preparation I (A) | −0.227 | 0.001 |
| Preparation I (B) | −0.221 | 0.001 |

2. Cleaning Tests in the Immersion Bath a. Equipment and Materials stainless steel plate (slightly roughened, surface area 1 cm×9 cm)

sheep's blood heparinized with 10 IU/ml of protamine sulfate or protamine chloride: ACILA GmbH marker points Ø 8 mm green demineralized water b. Procedure Preparation of Test Plates Heparinized Reactivated Sheep's Blood:

The heparinized sheep's blood and the protamine sulphate/protamine chloride were stored in a climate cabinet at 6° C. until the test. For the preparation of the test soiling, the sheep's blood and the protamine sulfate/protamine chloride should have reached a temperature of 20° C. The grease-free stainless steel plates were clamped on a rack and should be aligned horizontally as straight as possible.

75 μl of protamine sulfate or protamine chloride were briefly mixed with 5 ml of heparinized sheep's blood on a magnetic stirrer in a 50 ml glass beaker. 100 μl of this solution were pipetted onto each plate and distributed evenly with an inoculation loop without contaminating the mounting holes and the lateral surfaces. Each batch was then incubated for 1 hour at room temperature in water vapor-saturated air (100% air humidity RH). The rack of plates can be immersed in the demineralized water, but the plates must be stored above the water level. To set 100% RH, the bottom of an 8.5 liter plastic can was filled with at least 1 liter of demineralized water. The demineralized water must completely cover the bottom of the horizontally placed tray. The tray was covered with a lid at least 2 hours before the start (conditioning of the atmosphere). After 1 hour, the wet test specimens with the coagulated blood soiling were removed from the plastic tray and dried at room temperature.

The quality of the dry test plates was checked. Plates with air bubbles on the soiling or showing irregularities were excluded. A green marker dot was glued to each of the other plates. The test plates were stored in test tubes with screw caps at room temperature until use in the immersion test.

Immersion Test Procedure:

Concentration: 2.5 ml/l

Water quality: Demineralized water

Temperature: 45° C.±1° C.

Holding time: 4 min

Stirring speed: 350 rev/min (IKA RCT classic stirrer)

Test plate: heparinized, reactivated sheep's blood

Immersion cleaning tests were carried out with both test preparations at a dosage of 2.5 ml/l in demineralized water and a temperature of 45° C. with a contact time of 4 minutes. Four individual experiments were carried out with each formulation variant, the residue was stained with a 0.1% amido black solution and the area was determined. The mean values of the quadruplicate determinations are plotted in FIG. 3.

c. Evaluation

The evaluation was carried out visually with the dried plates. In addition, the evaluation was also carried out using the integrals of the remaining blood residues in relation to the total area of the test specimen with the aid of ImageJ software.

d. Results

FIG. 5 shows the results of the immersion cleaning tests with preparation (I) according to the invention and preparation (II) without phosphonate, where heparinized sheep's blood was used as soiling.

As FIG. 5 shows, a somewhat better cleaning result in the removal of heparinized sheep's blood was achieved with preparation (I) according to the invention than with the comparative preparation (II), which contains no phosphonate and only aminopolycarboxylates as chelating agents. In addition, the pH of the application solution of preparation (I) according to the invention, at 10.5, was even somewhat lower than that of the application solution of preparation (II), for which a pH of 10.7 was determined.

The liquid cleaning concentrate according to the invention and the ready-to-use application solution thereof of preparation (I), compared to the cleaning concentrate and the application solution thereof of preparation (II) without phosphonate, exhibit improved corrosion protection with respect to stainless steel, better material compatibility, for example with aluminum, and improved cleaning performance with respect to blood, despite a lower pH, which usually has the opposite effect. In addition, a buffering effect to the desired pH was observed due to the presence of the phosphonate over a wide concentration range.

3. Combination of Chelating Agents

The chelating agent MGDA was combined in each case with a second chelating agent (i.e. HEDTA, EDDS, IDS, GLDA, polyaspartate, EDTA), in addition to the phosphonate PBTC contained in a liquid cleaning concentrate according to the invention, and the corrosion-inhibiting properties and the cleaning performance with respect to sheep's blood were investigated for all the test preparations of this series.

1. Corrosion Tests

The corrosion tests were carried out with GG25 gray cast iron chips in accordance with DIN 51360 Part 2 at a concentration of the application solutions of 2.5%. The tests were carried out and evaluated analogously to the corrosion tests on the phosphonates described above.

2. Cleaning Tests in the Immersion Bath a. Equipment and Materials stainless steel plate (slightly roughened, surface area 1 cm×9 cm)

sheep's blood heparinized with 10 IU/ml of protamine sulfate or protaminechloride: ACILA GmbH marker points Ø 8 mm green demineralized water b. Procedure The test specimens with heparinized, reactivated sheep's blood were prepared as previously described.

Immersion Test Procedure:

Concentration: 2.0 ml/l

Water quality: Demineralized water

Temperature: 45° C.±1° C.

Holding time: 4 min

Stirring speed: 350 rev/min (IKA RCT classic stirrer)

Test plate: heparinized, reactivated sheep's blood

Immersion cleaning tests were carried out with both test preparations at a dosage of 2.0 ml/l in demineralized water and a temperature of 45° C. with a contact time of 4 minutes. Four individual experiments were carried out with each formulation variant, the residue was stained with a 0.1% amido black solution and the area was determined.

c. Evaluation

The cleaning results were evaluated visually with the dried plates. In addition, the evaluation was also performed here by integrating the area relative to other individual tests.

3. Results of the Corrosion and Cleaning Tests

Firstly, it was observed that the selection of the second chelating agent has an influence both on the cleaning performance and on the corrosion behavior of the liquid cleaning agent (cf. FIGS. 6 and 7). Secondly, a reciprocal relationship between corrosion behavior and cleaning performance was found (cf. FIG. 7). Thus, improved corrosion protection results in deterioration of the cleaning effect and vice versa. A further correlation can also be observed between the cleaning performance and the complex stabilities (log(K)) of the chelating agents with $Ca^{2+}$ and $Mg^{2+}$ ions (cf. FIG. 6). The use of chelating agents with higher log(K) values results in improved cleaning performance in the ready-to-use application solution, while this deteriorates accordingly when chelating agents with lower stability constants are used. This relationship can be seen particularly clearly when all three parameters are arranged in ascending order when plotted against the mean value of the log(K) values for $Ca^{2+}$ and $Mg^{2+}$ ions (cf. FIG. 7).

4. Cold Water Dispensing

In the prior art, enzymatic, mildly alkaline, liquid cleaning agents, which preferably comprise surfactants, are usually metered in at a water temperature of about 40° C. for machine cleaning. This is necessary because the cleaning agents tend to foam too much at lower temperatures. The disadvantage of dispensing at a temperature of about 40° C., however, is that the run time of the cleaning programs is prolonged, since there is initially a certain time delay for heating up from the inlet temperature (usually ca. 18-22° C.) to a temperature of 40° C. before the cleaning agent can take effect.

The liquid cleaning agent concentrate and the ready-to-use application solution according to the invention, in contrast, make it possible to carry out cold dispensing directly after the water inlet, preferably at a temperature of 38° C. or less, even more preferably of 18 to 35° C., even more preferably of 20 to 30° C., still more preferably of 22 to 27° C., even further preferably at about 25° C., without the program being aborted due to excessive foam development. This is currently not possible with the cleaning agents known from the prior art.

FIG. 8 shows the correct and complete program sequence (pressure and temperature curves) from a cleaning and disinfection system (UniClean PL II from MMM). Here, the liquid cleaning agent concentrate according to the invention was dispensed at a concentration of 3 ml/l at 25° C.

This was carried out analogously for some of the commercially available cleaning agents known from the prior art at the respective recommended standard concentration at 25° C. (inter alia Dr. Weigert, neodisher MediClean forte, 6 ml/l, #681964; Ruhof, Endozyme AW plus, 3.5 ml/l Dr. Schumacher, thermoshield Xtreme, 3 ml/l, #460764; Borer, deconex Twin pH10+Twin Zyme, 3 ml/l+1.5 ml/l, ±0370073+#0.397577; Prolystica, Prolystica 2× concentrate alkaline cleaner, 3 ml/l, #290186). For these cleaning agents, a program termination is observed, as is shown in FIG. 9.

The invention claimed is:

1. A liquid cleaning agent concentrate comprising:

A) at least one phosphonate selected from the group consisting of salts of i) phosphonobutanetricarboxylic acid (PBTC);

ii) aminotrismethylenephosphonic acid (ATMP);

iii) 1-hydroxyethane-1,1-diphosphonic acid (HEDP);

iv) diethylenetriamine penta(methylenephosphonic acid) (DTPMP); and mixtures thereof;

B) a first chelating agent being (hydroxyethyl)ethylenediaminetriacetic acid or a salt thereof;

C) a second chelating agent being methylglycinediacetic acid or a salt thereof; and D) at least one enzyme, wherein the pH of the liquid cleaning agent concentrate is from 9-12.

2. The liquid cleaning agent concentrate as claimed in claim 1, characterized in that the liquid cleaning agent concentrate has a pH of 10-12.

3. The liquid cleaning agent concentrate as claimed in claim 1, characterized in that the phosphonate is the sodium salt of phosphonobutane tricarboxylic acid, of aminotrismethylenephosphonic acid, or a mixture thereof.

4. The liquid cleaning agent concentrate as claimed in claim 1, characterized in that the liquid cleaning agent concentrate comprises the sodium salt of phosphonobutane-tricarboxylic acid, the sodium salt of aminotrimethylenephosphonic acid or a mixture thereof as the phosphonate, the sodium salt of (hydroxyethyl)ethylenediaminetriacetic acid as the first chelating agent, and the sodium salt of methylglycine diacetic acid as the second chelating agent.

5. The liquid cleaning agent concentrate as claimed in claim 1, characterized in that the liquid cleaning agent also comprises further constituents selected from surfactants, hydrotropes, alkanolamines, alkali metal hydroxides, solvents, corrosion inhibitors, fragrances and dyes.

6. The liquid cleaning agent concentrate as claimed in claim 1, characterized in that at least one of the following constituents is present in the liquid cleaning agent concentrate in the following proportions by weight in each case:

the phosphonate or phosphonate mixture in a proportion by weight of 1 to 13% by weight, based on the total mass of the liquid cleaning agent concentrate;

the first chelating agent in a proportion by weight of 0.5 to 10% by weight, based on the total mass of the liquid cleaning agent concentrate;

the second chelating agent in a proportion by weight of 0.5 to 10% by weight, based on the total mass of the liquid cleaning agent concentrate;

the enzyme or enzyme mixture in a proportion by weight of 0.05 to 4% by weight, based on the total mass of the liquid cleaning agent concentrate.

7. A ready-to-use application solution comprising 0.05 to 99.9% of the liquid cleaning agent concentrate as claimed in claim 1, wherein a pH of the ready-to-use application solution is 9-12.

8. The ready-to-use application solution as claimed in claim 7, characterized in that the liquid cleaning agent concentrate has a pH of 10-12.

9. A method for cleaning medical and/or surgical instruments and/or apparatuses, characterized by the following steps:

a) preparing a ready-to-use application solution as claimed in claim 7, b) cleaning of the medical and/or surgical instruments and/or apparatuses with the ready-to-use application solution.

10. The method as claimed in claim 9, characterized in that the ready-to-use application solution is prepared at a temperature of 38° C. or less.

11. The liquid cleaning agent concentrate as claimed in claim 1, characterized in that the enzyme is a proteolytic enzyme.

12. The liquid cleaning agent concentrate as claimed in claim 2, characterized in that the liquid cleaning agent concentrate has a pH of 10-11.

13. The liquid cleaning agent concentrate as claimed in claim 6, characterized in that at least one of the following constituents is present in the liquid cleaning agent concentrate in the following proportions by weight in each case:

the phosphonate or phosphonate mixture in a proportion by weight of 2 to 10% by weight, based on the total mass of the liquid cleaning agent concentrate;

the first chelating agent in a proportion by weight of 1 to 8% by weight, based on the total mass of the liquid cleaning agent concentrate;

the second chelating agent in a proportion by weight 1 to 8% by weight, based on the total mass of the liquid cleaning agent concentrate;

the enzyme or enzyme mixture in a proportion by weight of 0.1 to 2% by weight, based on the total mass of the liquid cleaning agent concentrate.

14. The ready-to-use application solution as claimed in claim 8, characterized in that the liquid cleaning agent concentrate has a pH of 10-11.

15. The method as claimed in claim 10, characterized in that the ready-to-use application solution is prepared at a temperature of 22 to 27° C.

* * * * *